(12) United States Patent
Wang et al.

(10) Patent No.: US 11,188,491 B1
(45) Date of Patent: Nov. 30, 2021

(54) HOST INTERCONNECTION DEVICE AND METHOD THEREOF

(71) Applicant: Shanghai Zhaoxin Semiconductor Co., Ltd., Shanghai (CN)

(72) Inventors: Weilin Wang, Beijing (CN); Xinyu Gao, Beijing (CN); Xiaoliang Kang, Shanghai (CN); Yang Shi, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/087,675

(22) Filed: Nov. 3, 2020

(30) Foreign Application Priority Data

Oct. 22, 2020 (CN) .......................... 202011140714.4

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .......................... G06F 13/4027; G06F 13/4282
See application file for complete search history.

(56) References Cited

U.S. PATENT DOCUMENTS

| | | | | |
|---|---|---|---|---|
| 5,704,058 A | * | 12/1997 | Derrick | G06F 12/0811 |
| | | | | 710/107 |
| 6,338,121 B1 | * | 1/2002 | Nunez | G06F 12/0831 |
| | | | | 711/140 |
| 6,615,323 B1 | * | 9/2003 | Petersen | G06F 12/0831 |
| | | | | 711/146 |
| 10,025,718 B1 | * | 7/2018 | Wasiq | G06F 11/3466 |
| 10,908,945 B2 | * | 2/2021 | Landers | G06F 12/0891 |
| 2009/0182836 A1 | * | 7/2009 | Aviles | H04L 67/2819 |
| | | | | 709/213 |
| 2012/0124295 A1 | * | 5/2012 | Humlicek | G06F 11/3409 |
| | | | | 711/136 |

(Continued)

*Primary Examiner* — Henry Tsai
*Assistant Examiner* — Christopher A Daley
(74) *Attorney, Agent, or Firm* — McClure, Qualey & Rodack, LLP

(57) ABSTRACT

A host interconnection device includes a serializing module, an analysis module, an arbitration module, a data-writing tracking module, and a data-reading tracking module. The serializing module serializes at least one first read/write request generated by at least one processing module and a second read/write request generated by a chipset module, and outputs the first read/write request or the second read/write request. The analysis module generates analysis information according to the first read/write request or the second read/write request. The arbitration module arbitrates the analysis information and snoop information, and generates arbitration information. The data-writing tracking module performs a data-writing tracking operation on the arbitration information to generate a first snoop request, a data-writing indication, and a data-writing request. The data-reading tracking module performs a data-reading tracking operation on the arbitration information to generate a second snoop request, a data-reading indication, and a data-reading request.

21 Claims, 4 Drawing Sheets

(56) References Cited

U.S. PATENT DOCUMENTS

2013/0159633 A1\* 6/2013 Lilly ................... G06F 12/0811
 711/146
2014/0149632 A1\* 5/2014 Kannan ............... G06F 12/1027
 711/3

\* cited by examiner

HOST INTERCONNECTION DEVICE AND METHOD THEREOF

CROSS REFERENCE TO RELATED APPLICATIONS

This application claims priority of China Patent Application No. 202011140714.4, filed on Oct. 22, 2020, the entirety of which is incorporated by reference herein.

BACKGROUND OF THE INVENTION

Field of the Invention

The present invention relates to an interconnection device, and in particular, it relates to a host interconnection device and a method thereof.

Description of the Related Art

In general, the on-chip interconnection manner of the current X86 system on a chip (SoC) mainly includes a ring bus architecture and a cross-bar architecture based on the core cluster. All cores in ring bus architecture share the last-level cache, which is easy to implement in a physical process. However, each core needs to increase to a two-level cache to alleviate the high-latency problem of last-level cache access. Cross-bar architecture is based on the core cluster, making it easy to realize the interconnection of a larger number of cores, and the latency of the cache access may not be increased with the increase of the number of cores. However, the cross-bar architecture based on the core cluster still has the problem of high latency.

Therefore, how to effectively decrease the latency of memory access has become a focus for technical improvements by various manufacturers.

BRIEF SUMMARY OF THE INVENTION

The present invention provides a host interconnection device and a method thereof, thereby decreasing the latency of memory access, and increasing the bandwidth of memory access.

The present invention provides a host interconnection device, which includes a serializing module, an analysis module, an arbitration module, a data-writing tracking module and a data-reading tracking module. The serializing module is configured to receive at least one first read/write request and a second read/write request, serialize the first read/write request and the second read/write request, and output the first read/write request or the second read/write request, wherein the first read/write request is generated by at least one processing module, and the second read/write request generated by a chipset module. The analysis module is configured to receive the first read/write request or the second read/write request, and generate analysis information according to the first read/write request or the second read/write request. The arbitration module is configured to receive the analysis information and snoop information, arbitrate the analysis information and the snoop information, and generate arbitration information. The data-writing tracking module is configured to receive the arbitration information, and perform a data-writing tracking operation on the arbitration information to generate a first snoop request, a data-writing indication, and a data-writing request. The data-reading tracking module is configured to receive the arbitration information, and perform a data-reading tracking operation on the arbitration information to generate a second snoop request, a data-reading indication, and a data-reading request.

In addition, the present invention provides a host interconnection method, which includes the following steps. At least one first read/write request and a second read/write request are received, the first read/write request and the second read/write request are serialized, and the first read/write request or the second read/write request is outputted, wherein the first read/write request is generated by at least one processing module, and the second read/write request generated by a chipset module. The first read/write request or the second read/write request is received, and analysis information is generated according to the first read/write request or the second read/write request. The analysis information and snoop information are received, the analysis information and the snoop information are arbitrated, and arbitration information is generated. The arbitration information is received, and a data-writing tracking operation is performed on the arbitration information to generate a first snoop request, a data-writing indication, and a data-writing request. The arbitration information is received, and a data-reading tracking operation is performed on the arbitration information to generate a second snoop request, a data-reading indication, and a data-reading request.

According to the host interconnection device and the method thereof disclosed by the present invention, the serializing module serializes the first read/write request provided by the processing module and the second read/write request provided by the chip module, and outputs the first read/write request or the second read/write request. The analysis module generates the analysis information according to the first read/write request or the second read/write request. The arbitration module arbitrates the analysis information and the snoop information, and generates the arbitration information. The data-writing tracking module performs the data-writing tracking operation on the arbitration information to generate the first snoop request, the data-writing indication and the data-writing request. The data-reading tracking module performs the data-reading tracking operation on the arbitration information to generate the second snoop request, the data-reading indication and the data-reading request. Therefore, the processing module and the chip module may be directly connected on-chip, so as to effectively decrease the latency of memory access and increase the bandwidth of memory access.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents an element or component that is the same or similar.

Figure 1:
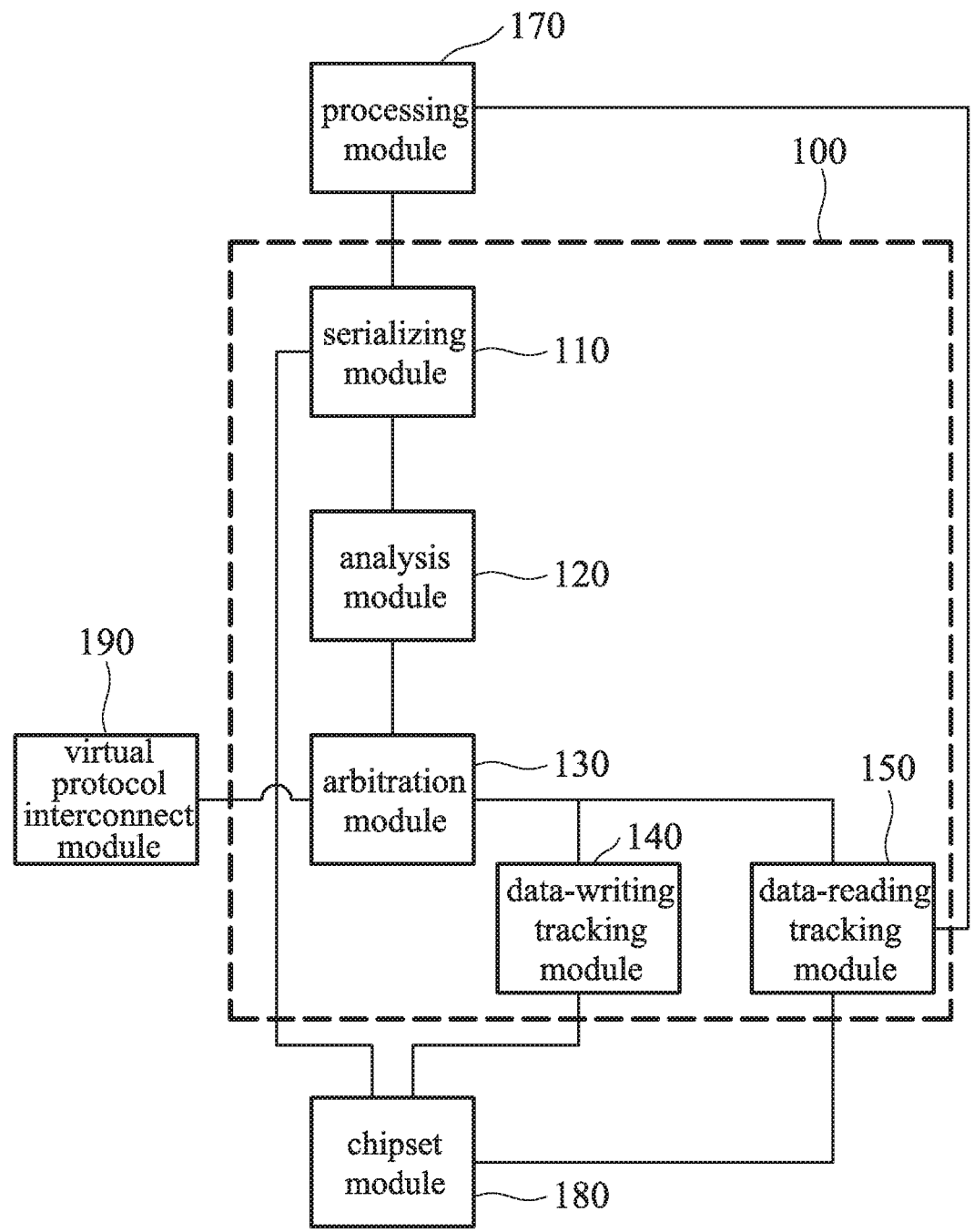
FIG. 1 is a schematic view of a host interconnection device according to an embodiment of the present invention.

FIG. 1 is a schematic view of a host interconnection device according to an embodiment of the present invention. The host interconnection device 100 of the embodiment is suitable to couple to a processing module 170 and a chip module 180, and the processing module 170 and the chip module 180 may perform an operation of data transmission through the host interconnection device 100. The processing module 170 may include a plurality of cores. The chip module 180 may include a device controller, a memory controller, a storage device, and a memory.

Please refer to FIG. 1. The host interconnection device 100 includes a serializing module 110, an analysis module 120, an arbitration module 130, a data-writing tracking module 140 and a data-reading tracking module 150.

The serializing module 110 receives a read/write request and a second read/write request, serializes the first read/write request and the second read/write request, and output the first read/write request or the second read/write request. In the embodiment, the first read/write request is generated by the processing module 170, and the second read/write request generated by the chipset module 180. In FIG. 1, a number of processing module 170 is shown as one, but the embodiment of the present invention is not limited thereto. In other embodiments, the number of processing modules may be two or more than two, each processing module 170 is connected to the serializing module 110 and a data-reading tracking module 150, and the same effect may be achieved. In addition, the user may adjust the number of processing module 170 to one or more according the requirements thereof, so that the host interconnection device 100 of the embodiment may have a configuration of a scalable interface.

Furthermore, when the number of processing module 170 is multiple, the serializing module 110 receives a plurality of first read/write requests and the second read/write request, serializes the first read/write requests and the second read/write request, and output one of the first read/write requests or the second read/write request. In the embodiment, when the number of processing module 170 is one, the serializing module 110 uses, for example, a round-robin manner to serialize the first read/write request and the second read/write request, and selects to output the first read/write request or the second read/write request. In another embodiment, when the number of processing module 170 is multiple, the serializing module 110 also uses, for example, the round-robin manner to serialize the first read/write requests and the second read/write request, and selects to output one of the first read/write requests or the second read/write request.

The analysis module 120 is coupled to the serializing module 110. The analysis module 120 receives the first read/write request or the second read/write request output after selection by the serializing module 110, and generates analysis information according to the first read/write request or the second read/write request. Furthermore, the analysis module 120 may generate at least one read/write request address corresponding to the first read/write request according to the first read/write request, so that the first read/write request may be allocated to each module (such as the device controller, the memory controller, the storage device or the memory) of the chip module 180, wherein the analysis information may include the read/write request address above. In addition, the analysis module 120 may search an interrupt information table (such as TPR table) stored in a task priority register (TPR) according to the second read/write request, so as to find the corresponding core of the processing module 170 to serve the interrupt request issued by the device of the chip module 180 and generate the corresponding analysis information.

The arbitration module 130 is coupled to the analysis module 120. The arbitration module 130 receives the analysis information and snoop information, arbitrates the analysis information and the snoop information, and generates arbitration information. In the embodiment, the arbitration module 130 uses, for example, the round-robin manner to arbitrate the analysis information and the snoop information, so as to select the analysis information or the snoop information as the arbitration information.

The data-writing tracking module 140 receives the arbitration information, and performs a data-writing tracking operation on the arbitration information to generate a first snoop request, a data-writing indication, and a data-writing request. Furthermore, the data-writing tracking module 140 may analyze the request of the arbitration information to determine whether the request of the arbitration information needs to be snooped, and whether the snoop response is received. If the snoop response is received, the state of the cache (for example, the data in the cache is hit or the data in the cache is not hit) needs to be identified, and then the first snoop request, the data-writing indication and the data-writing request are generated. In addition, when the data-writing tracking module 140 recognizes that the request in the arbitration information needs to access the cache snoop, the data-writing tracking module 140 may generate the first snoop request.

The data-reading tracking module 150 receives the arbitration information, and performs a data-reading tracking operation on the arbitration information to generate a second snoop request, a data-reading indication, and a data-reading request. Furthermore, after the data-reading tracking module 150 receives the request of the arbitration information, the data-reading tracking module 150 may transmit the request of the arbitration information to the processing module 170 for snooping operation, and wait the response generated by the processing module 170. When the data-reading tracking module 150 receives the response generated by the processing module 170, the data-reading tracking module 150 identifies the state of the response, and preferentially transmits the reading request to the memory controller of the chip module 180 to read data at the same time. Then, the data is read back, the data-reading tracking module 150 may recognize the cache data or the memory, and generate the second snoop request, a data-reading indication, and a data-reading request accordingly. In addition, when the data-reading tracking module 150 recognizes that the request in the arbitration information needs to access the cache snoop, the data-reading tracking module 150 may generate the second snoop request. Therefore, the processing module 170 and the chip module 180 may be directly connected on-chip, so as to effectively decrease the latency of memory access and increase the bandwidth of memory access (for example, the bandwidth may reach 16 GB/(S*GHz)).

Furthermore, when the host interconnection device 100 is coupled to a virtual protocol interconnect module 190, the arbitration module 130 may be further connected to the virtual protocol interconnect module 190 and may receive a third read/write request, wherein the third read/write request is generated by the virtual protocol interconnect module 190. Then, the arbitration module 130 may arbitrate the analysis information, the snoop information, and the third read/write request, and generate arbitration information.

In FIG. 1, a number of virtual protocol interconnect module 190 is shown as one, but the embodiment of the present invention is not limited thereto. In other embodiments, the number of virtual protocol interconnect module 190 may be two or more than two, and the same effect may be achieved. In addition, the user may adjust the number of virtual protocol interconnect module 190 to one or more according the requirements thereof, so that the host interconnection device 100 of the embodiment may have a configuration of a scalable interface.

Figure 2:
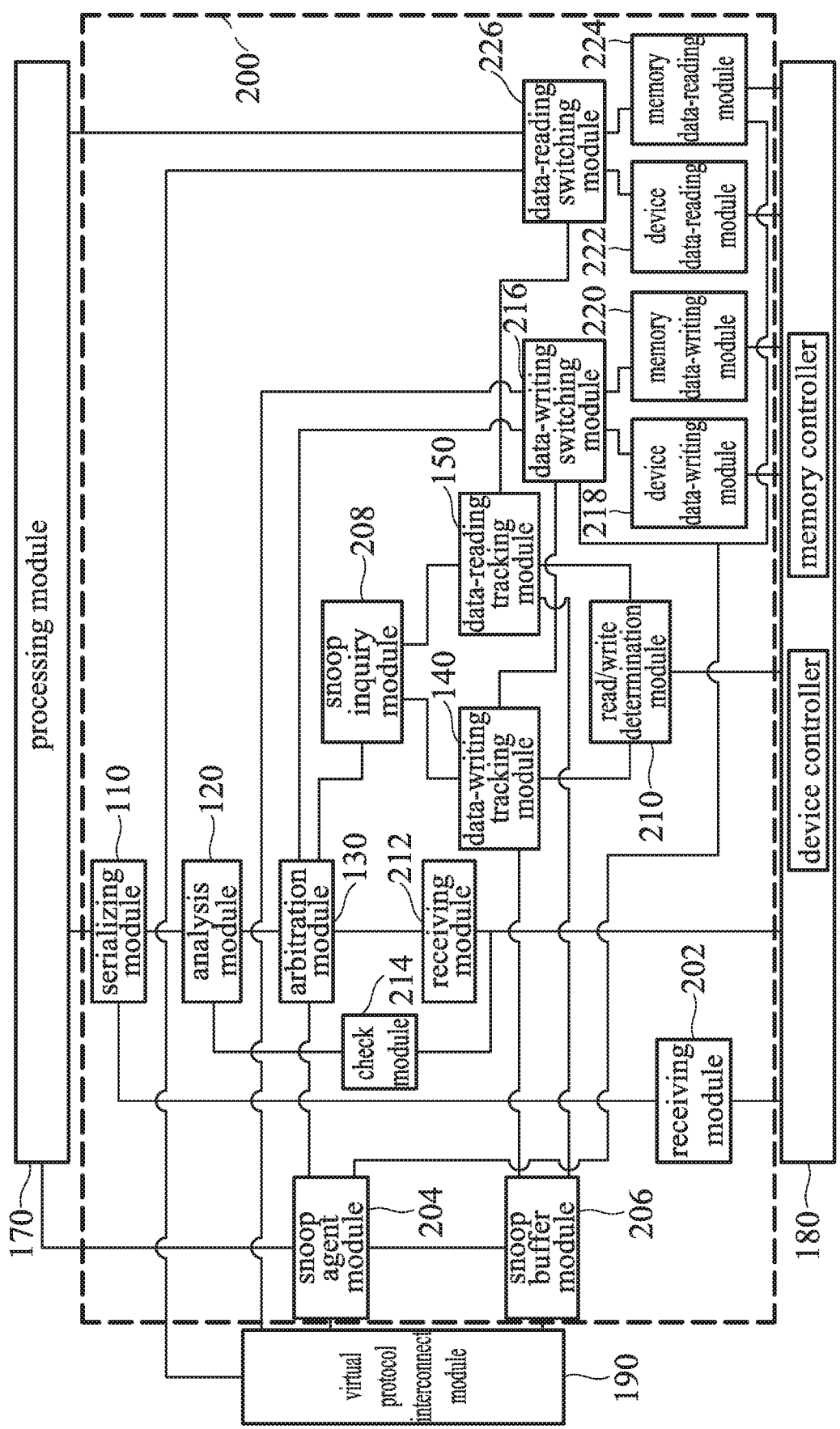
FIG. 2 is a schematic view of a host interconnection device according to another embodiment of the present invention.

FIG. 2 is a schematic view of a host interconnection device according to another embodiment of the present invention. The host interconnection device 200 includes a serializing module 110, an analysis module 120, an arbitration module 130, a data-writing tracking module 140, a data-reading tracking module 150, a receiving module 202, a snoop agent module 204, a snoop buffer module 206, a snoop inquiry module 208, a read/write determination module 210, a receiving module 212, a check module 214, a data-writing switching module 216, a device data-writing module 218, a memory data-writing module 220, a device data-reading module 222, a memory data-reading module 224 and a data-reading switching module 226.

In the embodiment, the serializing module 110, the analysis module 120, the arbitration module 130, the data-writing tracking module 140, the data-reading tracking module 150, the processing module 170, the chip module 180 and the virtual protocol interconnect module in FIG. 2 are the same as or similar to the serializing module 110, the analysis module 120, the arbitration module 130, the data-writing tracking module 140, the data-reading tracking module 150, the processing module 170, the chip module 180 and the virtual protocol interconnect module in FIG. 1, their description may refer to description of the embodiment of FIG. 1, and the description thereof is not repeated.

The receiving module 202 is coupled to the serializing module 110 and the chip module 180. The receiving module 202 receives and transmits a request and a data generated by the chip module 180, and merge the request above with the data above to generate a second read/write request.

The snoop agent module 204 receives a snoop response, the first snoop request, and the second snoop request, and generates the snoop information, wherein the snoop response is generated by the processing module 170. That is, the snoop agent module 204 may processes the sequence of the snoop response, the first snoop request, and the second snoop request to generate snoop information.

Furthermore, when the host interconnection device 200 is coupled to the virtual protocol interconnect module 190, the snoop agent module 204 may be coupled to the virtual protocol interconnect module 190 and may further receive a third snoop request generated by the virtual protocol interconnect module 190. The snoop agent module 204 generates the snoop information according to the snoop response, the first snoop request, the second snoop request, and the third snoop request. In addition, in FIG. 2, a number of virtual protocol interconnect module 190 is shown as one, but the embodiment of the present invention is not limited thereto. In other embodiments, the number of virtual protocol interconnect module 190 may be two or more than two, and the same effect may also be achieved. When the virtual protocol interconnect module 190 is multiple, each virtual protocol interconnect module 190 is connected to the snoop agent module 204 and the snoop buffer module 206.

The snoop buffer module 206 is coupled to the snoop agent module 204, the data-writing tracking module 140 and the data-reading tracking module 150. The snoop buffer module 206 receives and buffers the first snoop request and the second snoop request. That is, the snoop buffer module 206 may buffer the first snoop request generated by the data-writing tracking module 140 and the second snoop request generated by the data-reading tracking module 150, and then transmit the first snoop request and the second snoop request to the snoop agent module, so as to perform the subsequent process.

The snoop inquiry module 208 is coupled between the arbitration module 130, the data-writing tracking module 140 and the data-reading tracking module 150. The snoop inquiry module 208 may include a snoop table. The snoop inquiry module 208 may block unnecessary requests in the arbitration information according to information stored in the snoop table, and transmit the blocked arbitration information to the data-writing tracking module 140 and the data-reading tracking module 150.

The read/write determination module 210 is coupled to the data-writing tracking module 140 and the data-reading tracking module 150. The read/write determination module 210 selects to output the data-writing request of the data-writing tracking module 140 or the data-reading request of the data-reading tracking module 150 according to a read/write priority.

For example, in some embodiments, the load of the data-writing tracking module 140 is near full, the read/write determination module 210 needs to issue a read-cause-write-back request or the data-writing request of the data-writing tracking module 140. In some embodiments, if an eviction cycle request is not an entry address of the valid data-writing tracking module 140 with the same cache line, the eviction cycle request may have higher priority than the data-writing request of the data-writing tracking module 140.

In some embodiments, if eviction cycle hits the same address of the data-writing tracking module 140, the data-writing request of the data-writing tracking module 140 before (includes) the request address may have high priority than the eviction cycle. In some embodiments, if the request address of the data-reading request of the data-reading tracking module 150 hits the entry address of the valid data-writing tracking module 140 with the same cache line, the read/write determination module 210 needs to issue data-writing request of the data-writing tracking module 140 or the read-cause-write-back request.

In some embodiments, the read/write determination module 210 should check the snoop information of the data-writing tracking module 140 and the data-reading tracking module 150, so as to decide if the data-writing request of the data-writing tracking module 140 or the data-reading request (such the read-cause-write-back request) of the data-reading tracking module 150 needs to be issued to the device controller of the chip module 180.

In some embodiments, if the data-reading request of the data-reading tracking module 150 hits a valid previous entry of the data-reading tracking module 150 with the same cache line and there exists the previous read-cause-write-back request, the read-cause-write-back request may have high priority than the data-reading request of the data-reading tracking module 150.

In some embodiments, the data-writing request of the data-writing tracking module 140/the eviction cycle may be popped out in order. In some embodiments, the data-reading request of the data-reading tracking module 150 may be popped out out-of-order.

The receiving module 212 is coupled to the arbitration module 130. The receiving module 212 receives the arbitration information to obtain a device access request corresponding to the chip module 180, and transmits the device access request to a device controller of the chip module 180, so that the device controller may perform the corresponding operation according to the device access request.

The check module 214 is coupled to the receiving module 212 and the analysis module 120. The check module 214 receives the device access request, checks the device access request, records the request configuration of the device access request, and transmits the request configuration the analysis module 120. Accordingly, the analysis module 120 may further analyze the first read/write request or the second read/write request output by the serializing module 110 according to the request configuration provided by the check module 214.

The data-writing switching module 216 is coupled to the arbitration module 130, the snoop agent module, 204 and the data-writing tracking module 140. The data-writing switching module 216 receives the first writing request data in the arbitration information, the snoop data of the snoop information, and the data-writing indication, and switches to output the first writing request data or the snoop data according to the data-writing indication.

The device data-writing module 218 is coupled to the data-writing switching module 216. The device data-writing module 218 receives the first writing request data or the snoop data, and transmits the first writing request data or the snoop data to a device controller of the chip module. 180. That is, when the device data-writing module 218 receives the first writing request data or the snoop data, the device data-writing module 218 may determine whether the first writing request data or the snoop data is transmitted to the device controller of the chip module 180. When determining that the first writing request data or the snoop data is transmitted to the device controller of the chip module 180, the device data-writing module 218 may transmit the first writing request data or the snoop data to the device controller of the chip module 180, so that the device controller of the chip module 180 may perform the corresponding operation.

The memory data-writing module 220 is coupled to the data-writing switching module 216. The memory data-writing module 220 receives the first writing request data or the snoop data, and transmits the first writing request data or the snoop data to a memory controller of the chip module 180. That is when the memory data-writing module 220 receives the first writing request data or the snoop data, the memory data-writing module 220 may determine whether the first writing request data or the snoop data is transmitted to the memory controller of the chip module 180. When determining that the first writing request data or the snoop data is transmitted to the memory controller of the chip module 180, the memory data-writing module 220 may transmit the first writing request data or the snoop data to the memory controller of the chip module 180, so that the memory controller of the chip module 180 performs the corresponding operation.

Furthermore, when the host interconnection device 200 is coupled to the virtual protocol interconnect module 190, the data-writing switching module 216 may be further be coupled to the virtual protocol interconnect module 190, and may receive a second writing request data generated by the virtual protocol interconnect module 190. Then, the data-writing switching module 216 may switch to output the first writing request data, the snoop data or the second writing request data according to the data-writing indication. In addition, the device data-writing module 218 may further transmit the first writing request data, the snoop data or the second writing request data to the device controller of the chip module 180. The memory data-writing module 220 may further transmit the first writing request data, the snoop data, or the second writing request data to the memory controller of the chip module 180.

The device data-reading module 222 is coupled to the device controller of the chip module 180. The device data-reading module 222 receives and outputs a first reading data of the device controller of the chip module 180. The memory data-reading module 224 is coupled to the memory controller of the chip module 180. The memory data-reading module 224 receives the second reading data of the memory controller of the chip module 180 and the snoop data, and outputs the second reading data according to the snoop data. That is, when the snoop data contains the content of the second reading data, the memory data-reading module 224 may discard the second reading data. In addition, when the snoop data does not contain the content of the second reading data, the memory data-reading module 224 may output the second reading data provided by the memory controller of the chip module 180.

The data-reading switching module 226 is coupled to the device data-reading module 222, the memory data-reading module 224, and the data-reading tracking module 150. The data-reading switching module 226 receives the first reading data, the second reading data, and the data-reading indication, and switches to output the first reading data or the second reading data to the processing module 170 according to the data-reading indication, so as to performs the subsequent process.

Furthermore, when the host interconnection device 200 is coupled to the virtual protocol interconnect module 190, the data-reading switching module 226 may be further coupled to the virtual protocol interconnect module 190. The data-reading switching module 226 may further switch to output the first reading data or the second reading data to the processing module 170 or the virtual protocol interconnect module 190 according to the data-reading indication, so that the processing module 170 or the virtual protocol interconnect module 190 may perform the subsequent process.

Figure 3:
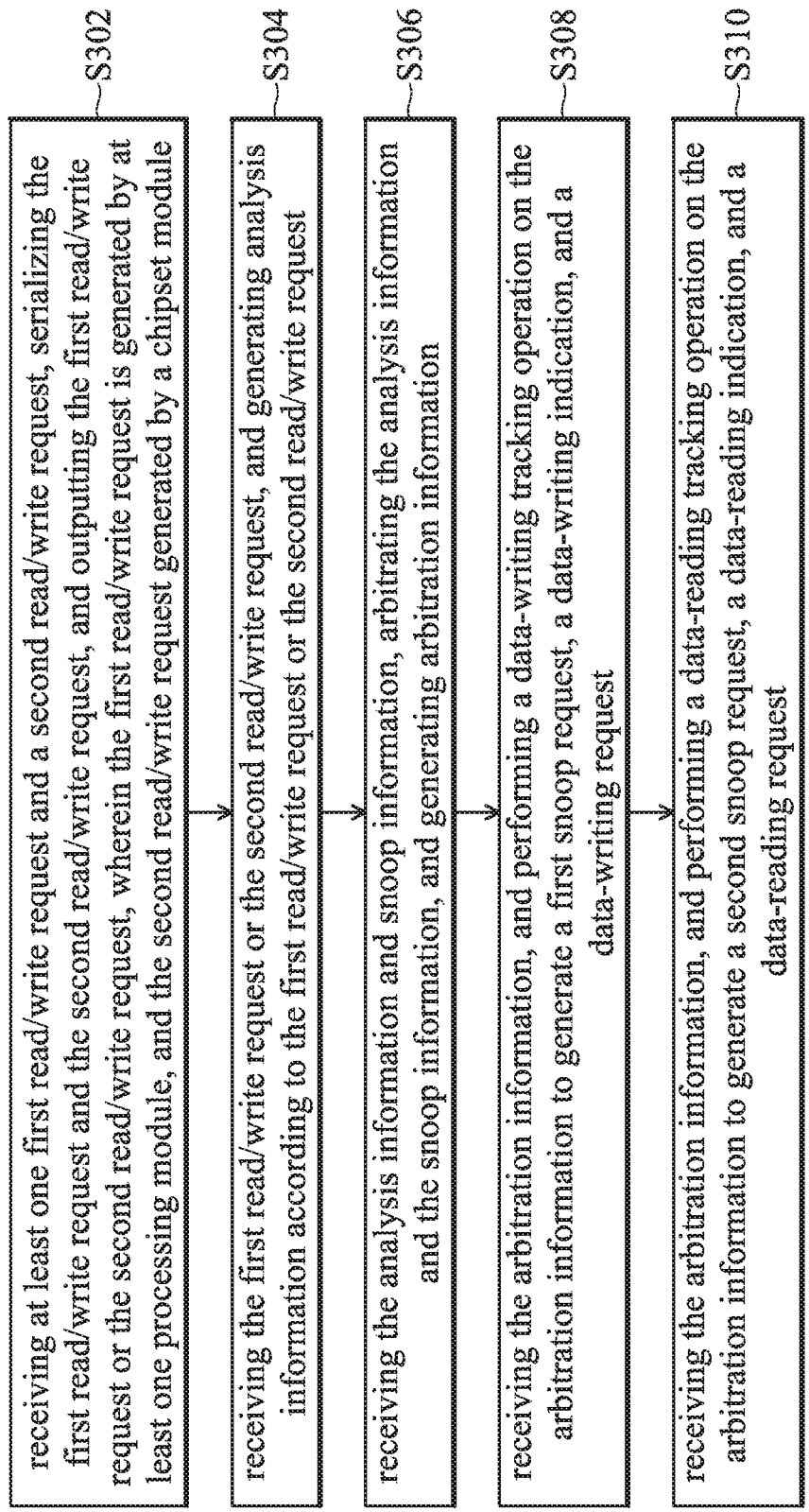
FIG. 3 is a flowchart of a host interconnection method according to an embodiment of the present invention.

FIG. 3 is a flowchart of a host interconnection method according to an embodiment of the present invention. In step S302, the method involves receiving at least one first read/write request and a second read/write request, serializing the first read/write request and the second read/write request, and outputting the first read/write request or the second read/write request, wherein the first read/write request is generated by at least one processing module, and the second read/write request generated by a chipset module.

In step S304, the method involves receiving the first read/write request or the second read/write request, and generating analysis information according to the first read/write request or the second read/write request. In step S306, the method involves receiving the analysis information and snoop information, arbitrating the analysis information and the snoop information, and generating arbitration information. In step S308, the method involves receiving the arbitration information, and performing a data-writing tracking operation on the arbitration information to generate a first snoop request, a data-writing indication, and a data-writing request. In step S310, the method involves receiving the arbitration information, and performing a data-reading tracking operation on the arbitration information to generate a second snoop request, a data-reading indication, and a data-reading request. Furthermore, in another embodiment, in step S306, in addition to receiving the analysis information and the snoop information, this step S306 may further receive at least one third read/write request, arbitrate the analysis information, the snoop information, and the third read/write request, and generate arbitration information, wherein the third read/write request is generated by at least one virtual protocol interconnect module.

Figure 4:
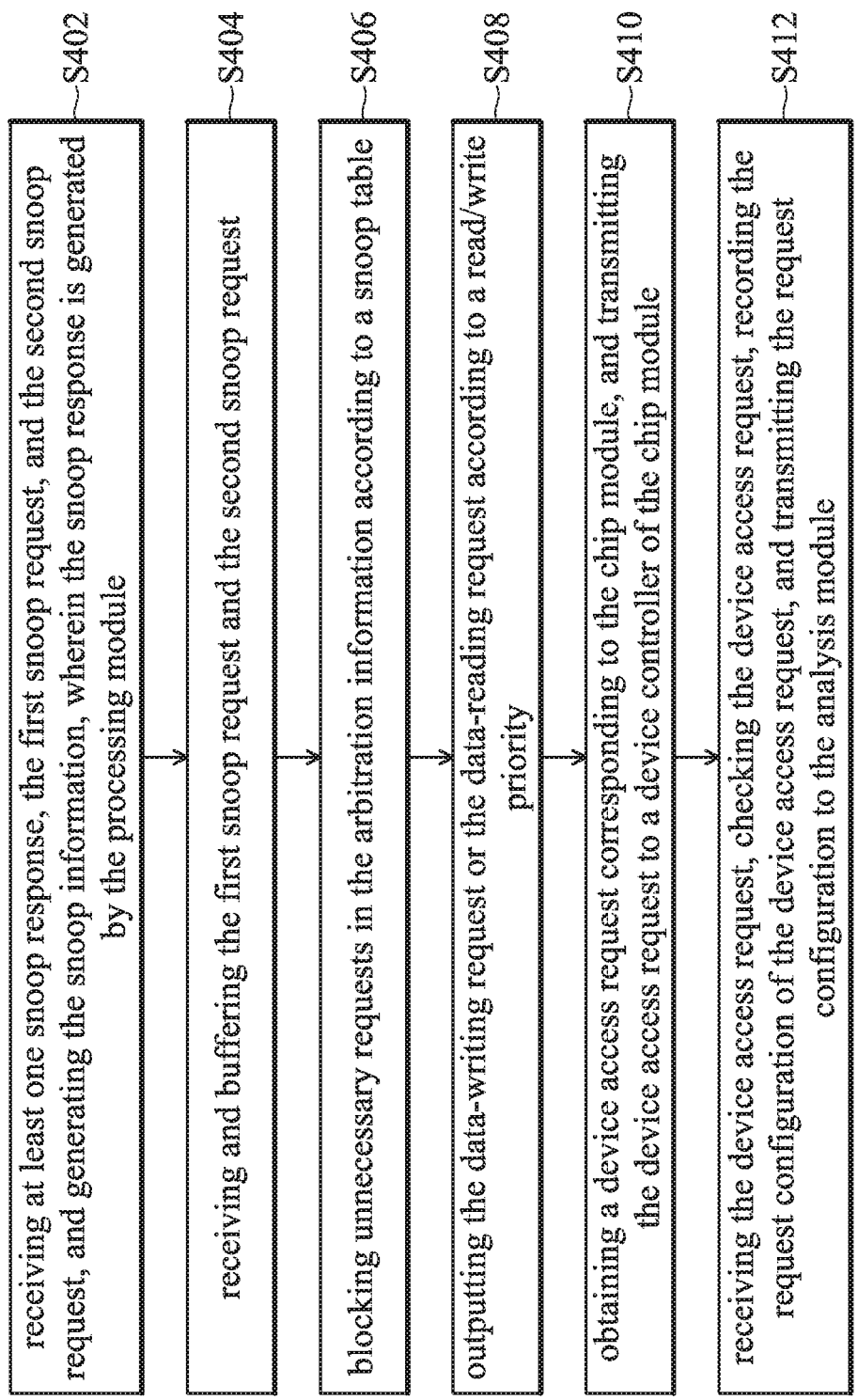
FIG. 4 is a flowchart of a host interconnection method according to another embodiment of the present invention.

FIG. 4 is a flowchart of a host interconnection method according to another embodiment of the present invention. The flowchart in FIG. 4 may be continued from step S310 in FIG. 3, but the embodiment of the present invention. In step S402, the method involves receiving at least one snoop response, the first snoop request, and the second snoop request, and generating the snoop information, wherein the snoop response is generated by the processing module. In step S404, the method involves receiving and buffering the first snoop request and the second snoop request.

In step S406, the method involves blocking unnecessary requests in the arbitration information according to a snoop table. In step S408, the method involves outputting the data-writing request or the data-reading request according to a read/write priority. In step S410, the method involves obtaining a device access request corresponding to the chip module, and transmitting the device access request to a device controller of the chip module. In step S412, the method involves receiving the device access request, checking the device access request, recording the request configuration of the device access request, and transmitting the request configuration to the analysis module.

Furthermore, in another embodiment, in step S402, in addition to receiving the snoop response, the first snoop request and the second snoop request, this step S402 may further receive at least one third snoop request, and generate snoop information according to the snoop response, the first snoop request, the second snoop request, and the third snoop request, wherein the third snoop request is generated by at least one virtual protocol interconnect module.

It should be noted that the order of the steps in FIG. 3 and FIG. 4 is only for illustrative purposes, and is not intended to limit the order of the steps of the present disclosure. The user may change the order of the steps above according the requirement thereof. The flowcharts described above may add additional steps or use fewer steps without departing from the spirit and scope of the present disclosure.

In summary, according to the host interconnection device and the method thereof disclosed by the present invention, the serializing module serializes the first read/write request provided by the processing module and the second read/write request provided by the chip module, and outputs the first read/write request or the second read/write request. The analysis module generates the analysis information according to the first read/write request or the second read/write request. The arbitration module arbitrates the analysis information and the snoop information, and generates the arbitration information. The data-writing tracking module performs the data-writing tracking operation on the arbitration information to generate the first snoop request, the data-writing indication and the data-writing request. The data-reading tracking module performs the data-reading tracking operation on the arbitration information to generate the second snoop request, the data-reading indication and the data-reading request. Therefore, the processing module and the chip module may be directly connected on-chip, so as to effectively decrease the latency of memory access and increase the bandwidth of memory access. In addition, in the embodiment, the number of processing module may include one or more, and the number of virtual protocol interconnect module may be include one or more, so that the host interconnection device of the embodiment may have a configuration of a scalable interface.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A host interconnection device, comprising:
    a serializing module, configured to receive at least one first read/write request and a second read/write request, serialize the at least one first read/write request and the second read/write request, and output the at least one first read/write request or the second read/write request, wherein the at least one first read/write request is generated by at least one processing module, and the second read/write request generated by a chipset module;
    an analysis module, configured to receive the at least one first read/write request or the second read/write request, and generate analysis information according to the at least one first read/write request or the second read/write request;
    an arbitration module, configured to receive the analysis information and snoop information, arbitrate the analysis information and the snoop information, and generate arbitration information;
    a data-writing tracking module, configured to receive the arbitration information, and perform a data-writing tracking operation on the arbitration information to generate a first snoop request, a data-writing indication, and a data-writing request; and
    a data-reading tracking module, configured to receive the arbitration information, and perform a data-reading tracking operation on the arbitration information to generate a second snoop request, a data-reading indication, and a data-reading request.

2. The host interconnection device as claimed in claim 1, wherein the arbitration module is further configured to receive at least one third read/write request, arbitrate the analysis information, the snoop information, and the at least one third read/write request, and generate arbitration information, wherein the at least one third read/write request is generated by at least one virtual protocol interconnect module.

3. The host interconnection device as claimed in claim 1, further comprising:
    a snoop agent module, configured to receive at least one snoop response, the first snoop request, and the second snoop request, and generate the snoop information, wherein the at least one snoop response is generated by the at least one processing module; and
    a snoop buffer module, coupled to the snoop agent module, the data-writing tracking module, and the data-reading tracking module, and configured to receive and buffer the first snoop request and the second snoop request.

4. The host interconnection device as claimed in claim 3, wherein the snoop agent module is further configured to receive at least one third snoop request, and generate the snoop information according to the at least one snoop response, the first snoop request, the second snoop request, and the at least one third snoop request, wherein the at least one third snoop request is generated by at least one virtual protocol interconnect module.

5. The host interconnection device as claimed in claim 1, further comprising:
  a snoop inquiry module, coupled between the arbitration module, the data-writing tracking module, and the data-reading tracking module, wherein the snoop inquiry module comprises a snoop table, and the snoop inquiry module blocks unnecessary requests in the arbitration information according to the snoop table.

6. The host interconnection device as claimed in claim 1, further comprising:
  a read/write determination module, coupled to the data-writing tracking module and the data-reading tracking module, and configured to output the data-writing request of the data-writing tracking module or the data-reading request of the data-reading tracking module according to a read/write priority.

7. The host interconnection device as claimed in claim 1, further comprising:
  a receiving module, coupled to the arbitration module, and configured to receive the arbitration information to obtain a device access request corresponding to the chip module, and transmit the device access request to a device controller of the chip module.

8. The host interconnection device as claimed in claim 7, further comprising:
  a check module, coupled to the receiving module and the analysis module, and configured to receive the device access request, check the device access request, record a request configuration of the device access request, and transmit the request configuration to the analysis module.

9. The host interconnection device as claimed in claim 8, further comprising:
  a data-writing switching module, configured to receive first writing request data in the arbitration information, snoop data of the snoop information, and the data-writing indication, and then switch to output the first writing request data or the snoop data according to the data-writing indication;
  a device data-writing module, coupled to the data-writing switching module, and configured to receive the first writing request data or the snoop data, and transmit the first writing request data or the snoop data to a device controller of the chip module; and
  a memory data-writing module, coupled to the data-writing switching module, and configured to receive the first writing request data or the snoop data, and transmit the first writing request data or the snoop data to a memory controller of the chip module.

10. The host interconnection device as claimed in claim 9, wherein the data-writing switching module is further configured to receive at least one second writing request data generated by at least one virtual protocol interconnect module, and then switch to output the first writing request data, the snoop data or the at least one second writing request data according to the data-writing indication; the device data-writing module is further configured to transmit the first writing request data, the snoop data or the at least one second writing request data to the device controller of the chip module; the memory data-writing module is further configured to transmit the first writing request data, the snoop data, or the at least one second writing request data to the memory controller of the chip module.

11. The host interconnection device as claimed in claim 8, further comprising:

a device data-reading module, configured to receive and output a first reading data of a device controller of the chip module;
  a memory data-reading module, configured to receive second reading data of a memory controller of the chip module and snoop data of the snoop information, and output the second reading data according to the snoop data; and
  a data-reading switching module, configured to receive the first reading data, the second reading data, and the data-reading indication, and then switch to output the first reading data or the second reading data to the at least one processing module according to the data-reading indication.

12. The host interconnection device as claimed in claim 11, wherein the data-reading switching module is further configured to switch to output the first reading data or the second reading data to the at least one processing module or at least one virtual protocol interconnect module according to the data-reading indication.

13. The host interconnection device as claimed in claim 1, further comprising:
  a receiving module, coupled to the serializing module, and configured to receive a request and a data of the chip module to generate the second read/write request.

14. A host interconnection method, comprising:
  receiving at least one first read/write request and a second read/write request, serializing the at least one first read/write request and the second read/write request, and outputting the at least one first read/write request or the second read/write request, wherein the at least one first read/write request is generated by at least one processing module, and the second read/write request generated by a chipset module;
  receiving the at least one first read/write request or the second read/write request, and generating analysis information according to the at least one first read/write request or the second read/write request;
  receiving the analysis information and snoop information, arbitrating the analysis information and the snoop information, and generating arbitration information;
  receiving the arbitration information, and performing a data-writing tracking operation on the arbitration information to generate a first snoop request, a data-writing indication, and a data-writing request; and
  receiving the arbitration information, and performing a data-reading tracking operation on the arbitration information to generate a second snoop request, a data-reading indication, and a data-reading request.

15. The host interconnection method as claimed in claim 14, wherein the method further receives at least one third read/write request, arbitrates the analysis information, the snoop information, and the at least one third read/write request, and generates arbitration information, wherein the at least one third read/write request is generated by at least one virtual protocol interconnect module.

16. The host interconnection method as claimed in claim 14, further comprising:
  receiving at least one snoop response, the first snoop request, and the second snoop request, and generating the snoop information, wherein the at least one snoop response is generated by the at least one processing module; and
  receiving and buffering the first snoop request and the second snoop request.

17. The host interconnection method as claimed in claim 16, wherein the method further receives at least one third snoop request, and generates the snoop information according to the at least one snoop response, the first snoop request, the second snoop request, and the at least one third snoop request, wherein the at least one third snoop request is generated by at least one virtual protocol interconnect module.

18. The host interconnection method as claimed in claim 14, further comprising:
   blocking unnecessary requests in the arbitration information according to a snoop table.

19. The host interconnection method as claimed in claim 14, further comprising:
   outputting the data-writing request or the data-reading request according to a read/write priority.

20. The host interconnection method as claimed in claim 14, further comprising:
   obtaining a device access request corresponding to the chip module, and transmitting the device access request to a device controller of the chip module.

21. The host interconnection method as claimed in claim 20, further comprising:
   receiving the device access request, checking the device access request, recording a request configuration of the device access request, and transmitting the request configuration to the analysis module.

* * * * *